United States Patent [19]

Cheng

[11] Patent Number: 5,582,395
[45] Date of Patent: Dec. 10, 1996

[54] BUFFER ASSEMBLY FOR FRONT FORKS

[75] Inventor: Paul Cheng, Tainan, Taiwan

[73] Assignee: Taiwan Hodaka Industrial Co., Ltd., Tainan Hsien, Taiwan

[21] Appl. No.: 574,894

[22] Filed: Dec. 19, 1995

[51] Int. Cl.⁶ .................................................... B60G 13/00
[52] U.S. Cl. ........................... 267/219; 267/35; 267/140.2
[58] Field of Search .................................. 267/35, 33, 34, 267/219, 292, 293, 294, 140.2, 141.1; 280/276, 279

[56] References Cited

U.S. PATENT DOCUMENTS

| | | | |
|---|---|---|---|
| 5,104,101 | 4/1992 | Anderson et al. | 267/141.1 X |
| 5,284,352 | 2/1994 | Chen | 267/140.2 X |
| 5,367,918 | 11/1994 | Chang et al. | 267/279 X |
| 5,417,446 | 5/1995 | Pileggi | 267/219 X |
| 5,449,189 | 9/1995 | Chen | 267/141.1 X |

Primary Examiner—Lee W. Young
Attorney, Agent, or Firm—Bacon & Thomas

[57] ABSTRACT

A buffer assembly for front forks has an oil-cylinder type buffer device disposed in one stay and a spring type buffer device disposed in the other stay. The oil-cylinder type buffer device has an adjustable screw, an adjusting rod, an adjusting device, an oil cylinder, elastic members, padding members, a shaft, a hollow seat, a spring, and a lower stay. The spring type buffer device has an adjustable bolt, an upper stay, an upper rod, an upper seat, soft pads, hard pads, a lower seat and a lower rod.

3 Claims, 3 Drawing Sheets

5,582,395

1

BUFFER ASSEMBLY FOR FRONT FORKS

BACKGROUND OF THE INVENTION

The invention relates to a buffer assembly for front forks of a bicycle. More particularly, the invention relates to a buffer assembly which has both spring type buffer device and oil-cylinder type buffer device.

A conventional buffer device for front forks of a bicycle has a spring type buffer device. Another conventional buffer device for front forks of a bicycle has an oil-cylinder type buffer device. The spring type buffer device can absorb certain type of shock effectively, but it cannot absorb other types of shock effectively. The oil-cylinder type buffer device can absorb some types of shock effectively, but it cannot absorb certain type of shock effectively. The oil-cylinder type buffer device has additional disadvantages. There is a gap between tile oil cylinder and the corresponding padding member in the buffer device, so the period of compression of the oil cylinder is different from that of the padding member. Thus the buffer device cannot be operated smoothly. The buffer device will make noise while in operation.

SUMMARY OF THE INVENTION

An object of the invention is to provide a buffer assembly for front forks of a bicycle which has an oil cylinder and a large number of elastic members disposed coaxially so that the oil cylinder and the elastic members can buffer the shock synchronously.

Another object of the invention is to provide a buffer assembly for front forks of a bicycle which has both spring type buffer device and oil-cylinder type buffer device in order to buffer various types of shock.

Yet another object of the invention is to provide a buffer assembly for front forks of a bicycle which has an elastic member adjacent to an oil cylinder in order to avoid the noise produced by the oil cylinder and the elastic member.

Accordingly, a buffer assembly for front forks comprises an oil-cylinder type buffer device disposed in the first stay and a spring type buffer device disposed in the second stay, respectively. The oil-cylinder type buffer device has an adjustable screw, an adjusting rod, an adjusting device, an oil cylinder, a large number of hollow elastic members and hollow padding members disposed therein alternatively, a shaft passing through the corresponding elastic members and padding members alternatively, a hollow seat, a spring, and a lower stay. The oil cylinder has an outer pipe, an inner pipe and a piston therein. The lower end of the shaft connects the bottom portion of the lower stay. The upper end of the shaft extends downward from the piston. The spring is disposed between the lower end of the lower stay and the seat. The adjusting device is disposed between the oil cylinder and the adjusting rod. The upper end of the adjusting rod is screwed by the adjustable screw. The adjustable screw covers the upper orifice of the upper stay. The adjusting device has a hollow interior, an end hole communicating with the hollow interior and the oil cylinder, a blocking rod in the hollow interior, a slant hole at one side of the hollow interior communicating with the hollow interior and the outer pipe of the oil cylinder, and a ball in the slant hole. The upper portion of the blocking rod connects the adjusting rod. The lower end of the blocking rod blocks the end hole. The spring type buffer device has an adjustable bolt, an upper stay, an upper rod, an upper seat, a large number of soft pads and hard pads disposed therein alter-

2 natively, a lower seat and a lower rod. The lower end of the lower rod connects the bottom portion of the lower stay. The upper end of the upper rod is screwed by the adjustable bolt. The soft pads and hard pads are disposed between the upper stay and the lower stay. The adjustable bolt covers the upper orifice of the upper stay.

DETAILED DESCRIPTION OF THE INVENTION

Figure 1:
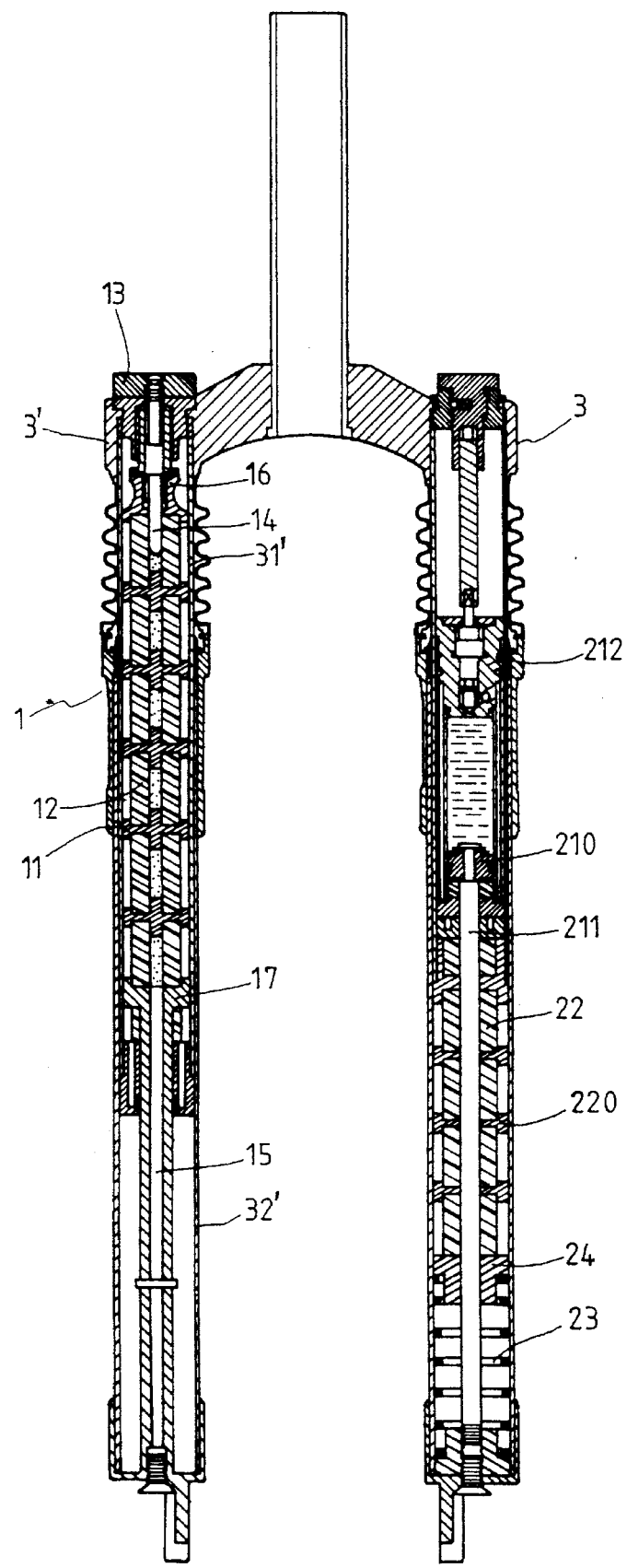
FIG. 1 is a cross-sectional view of a buffer assembly for front forks of a preferred embodiment in accordance with the invention.
Figure 2:
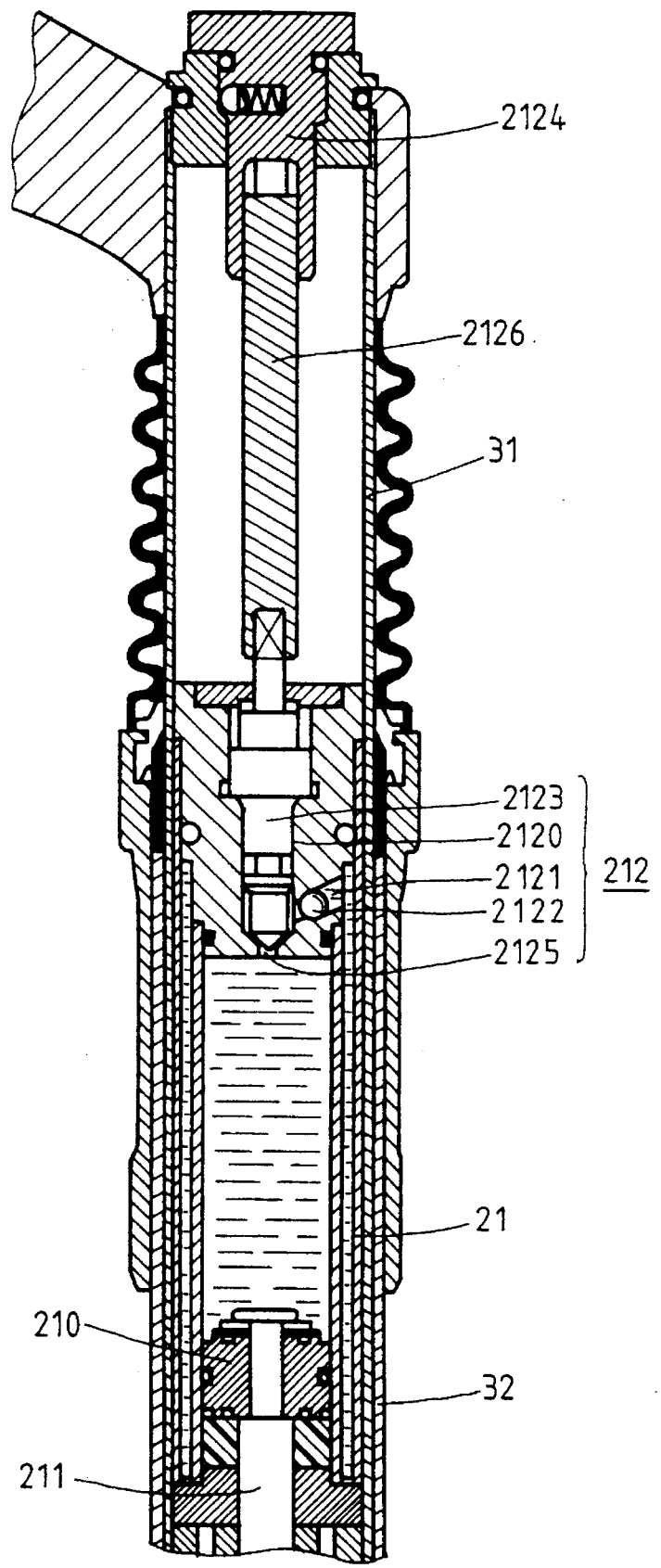
FIG. 2 is a partly cross-sectional view of the second buffer device and the adjusting device therein.
Figure 3:
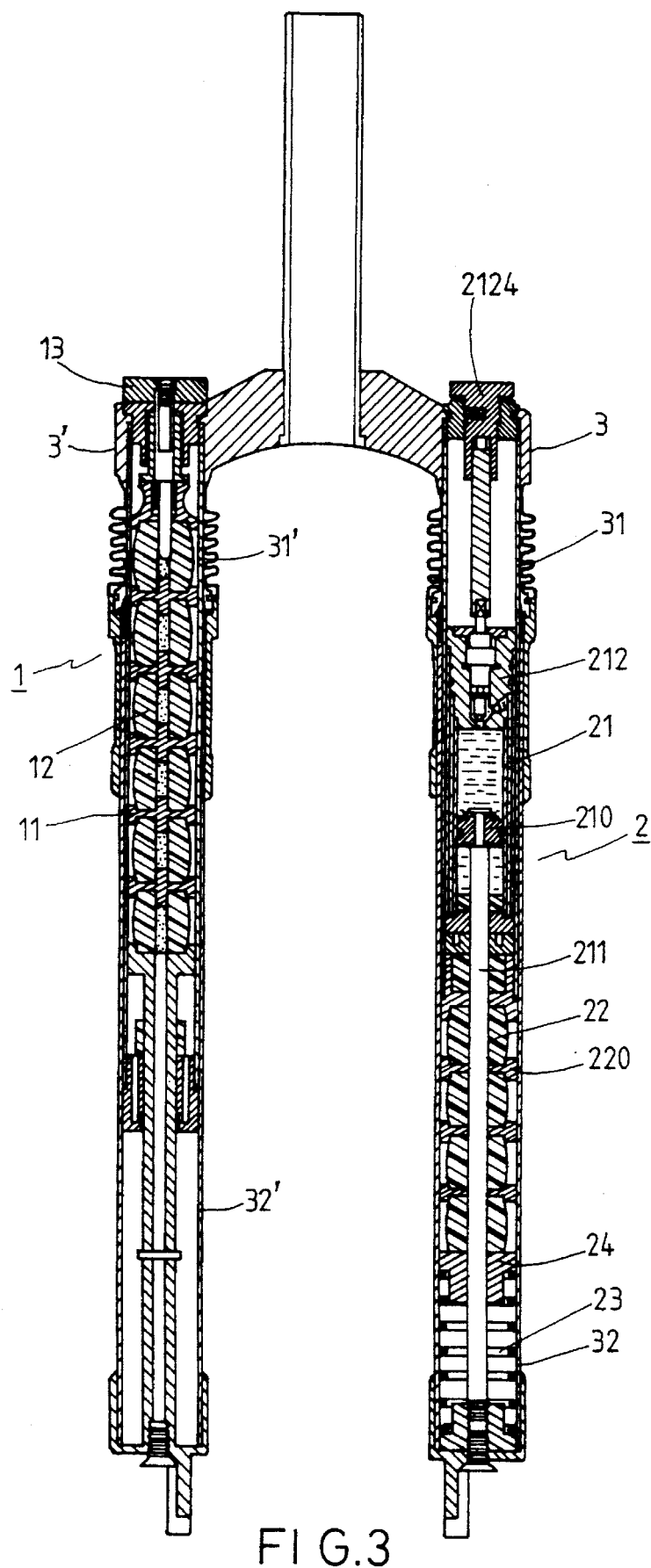
FIG. 3 is a cross-sectional view illustrating the operation of the buffer assembly.

Referring to FIGS. 1 to 3, a buffer assembly for front forks has an oil-cylinder type buffer device 3 disposed in the first stay 3 and a spring type buffer device 1 disposed in the second stay 3', respectively. The spring type buffer device 1 has an adjustable bolt 13, an upper stay 31', an upper rod 14, an upper seat 16, a large number of soft pads 12 and hard pads 11 disposed therein alternatively, a lower seat 17 and a lower rod 15. The lower end of the lower rod 15 connects the bottom portion of the lower stay 32'. The upper end of the upper rod 14 is screwed by the adjustable bolt 13. The soft pads 12 and hard pads 11 are disposed between the upper stay 31' and the lower stay 32'. The adjustable bolt 13 covers the upper orifice of the upper stay 31'. The oil-cylinder type buffer device has an adjustable screw 2124, an adjusting rod 2126, an adjusting device 212, an oil cylinder 21, a large number of hollow elastic members 22 and hollow padding members 220 disposed therein alternatively, a shaft 211 passing through the corresponding elastic members 22 and padding members 220 alternatively, a hollow seat 24, a spring 23, and a lower stay 32. The oil cylinder 21 has an outer pipe, an inner pipe and a piston 210 therein. The lower end of the shaft 211 connects the bottom portion of the lower stay 32. The upper end of the shaft 11 extends from the piston 210. The spring 23 is disposed between the lower end of the lower stay 32 and the seat 24. The adjusting device 212 is disposed between the oil cylinder 21 and the adjusting rod 2126. The upper end of the adjusting rod 2126 is screwed by the adjustable screw 2124. The adjustable screw 2124 covers the upper orifice of the upper stay 31.

Referring to FIG. 2, the adjusting device 212 has a hollow interior 2120, an end hole 2125 communicating with the hollow interior 2120 and the oil cylinder 21, a blocking rod 2123 in the hollow interior 2120, a slant hole 2121 at one side of the hollow interior 2120 communicating with the hollow interior 2120 and the outer pipe of the oil cylinder 21, and a ball 2125 in the slant hole 2121. The upper portion of the blocking rod 2123 connects the adjusting rod 2126. The lower end of the blocking rod 2123 blocks the end hole 2125.

Referring to FIGS. 1 to 3 again, the upper end of the shaft 11 extends downward from the piston 210. The shaft 211 passes through the corresponding elastic members 22 and padding members 220 alternatively. Thus the piston 210, the elastic members 22 and the padding members 220 are disposed coaxially. There is no gap between the oil cylinder 21, the elastic members 22, the padding members 220 and the spring 23. The oil cylinder 21, the elastic members 22, the padding members 220 and the spring 23 can be operated to buffer the shock sychronously. The adjustable screw 2124 can be adjusted according to the bumping condition of the rough road and the weight of the user. Thus the adjusting device 212 and the adjusting rod 2126 can be adjusted according to the adjustment of the adjustable screw 2124. The blocking rod 2123 can adjust the gap between the blocking rod 2123 and the end hole 2125 to produce various kinds of buffer forces for the oil cylinder 21. Referring to FIG. 3, the oil-cylinder type buffer device 3 is compressed while the bicycle bumps along the rough road. The shaft 211 will push the piston 210 upward, so the bumping force is buffered. Since there is no gap between the oil cylinder 21, the elastic members 22, the padding members 220 and the spring 23, the operation of the oil-cylinder type buffer device 3 will be very smooth. The oil-cylinder type buffer device 3 will not make noise while in operation.

The invention is not limited to the above embodiment but various modification thereof may be made. It will be understood by those skilled in the art that various changes in form and detail may be made without departing from the scope of the invention.

I claim:

1. A buffer assembly for front forks comprising;

an oil-cylinder type buffer device disposed in a first stay and a spring type buffer device disposed in a second stay, respectively;

said oil-cylinder type buffer device having an adjustable threaded fastener, an adjusting rod, an adjusting device, an oil cylinder, a large number of hollow elastic members and hollow padding members disposed therein alternatively, a shaft passing through said elastic members and said padding members alternatively, a hollow seat, a spring, and a lower stay;

said oil cylinder having an outer pipe, an inner pipe and a piston therein;

a lower end of said shaft connecting a bottom portion of said lower stay;

an upper end of said shaft extending downward from said piston;

said spring disposed between a lower end or said lower stay and said seat;

said adjusting device disposed between said oil cylinder and said adjusting rod;

an upper end of said adjusting rod screwed by said adjustable threaded fastener;

said adjustable threaded fastener covering an upper orifice of an upper stay;

said adjusting device having a hollow interior, an end hole communicating with said hollow interior and said oil cylinder, a blocking rod in said hollow interior, a slant hole at one side of said hollow interior communicating with said hollow interior and said outer pipe of said oil cylinder, and a ball in said slant hole;

an upper portion of said blocking rod connecting said adjusting rod;

a lower end of said blocking rod blocking said end hole;

said spring type buffer device having an adjustable fastening member, an upper stay, an upper rod, an upper seat, a large number of soft pads and hard pads disposed therein alternatively, a lower seat and a lower rod;

said lower end of said lower rod connecting a bottom portion of a lower stay of said spring type buffer;

an upper end of said upper rod screwed by said adjustable fastening member;

said soft pads and hard pads of said spring type buffer are disposed between said upper stay and said lower stay of said spring type buffer; and said adjustable fastening member covering an upper orifice of said upper stay.

2. A buffer assembly for front forks as claimed in claim 1, wherein said adjustable threaded fastener is an adjustable screw.

3. A buffer assembly for front forks as claimed in claim 1, wherein said adjustable fastening member is an adjustable bolt.

* * * * *